Feb. 25, 1958

O. E. SMITH 2,824,572

CUT-OFF VALVE

Filed June 2, 1953

Olen E. Smith
INVENTOR.

United States Patent Office 2,824,572
Patented Feb. 25, 1958

2,824,572
CUT-OFF VALVE

Olen E. Smith, El Dorado, Kans., assignor of one-half to W. H. Rex, El Dorado, Kans.

Application June 2, 1953, Serial No. 359,061

1 Claim. (Cl. 137—464)

This invention relates in general to valve structures and pertains more particularly to an improved form of cut-off valve.

The primary object of this invention is to provide an improved cut-off valve assembly which operates in response to a reduction in pressure in a fluid line to positively close and remain in such position until manipulated with a manual reset mechanism.

Another object of this invention is to provide a valve mechanism in conformity with the foregoing objects which embodies a novel valve body and support means therefor which operate to allow effective and positive sealing when in operation.

Figure 1:
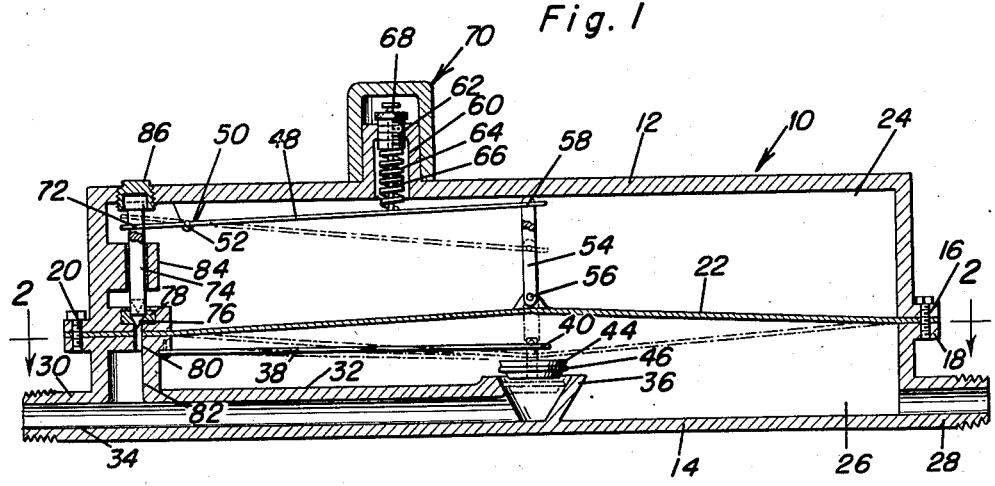
Figure 2:
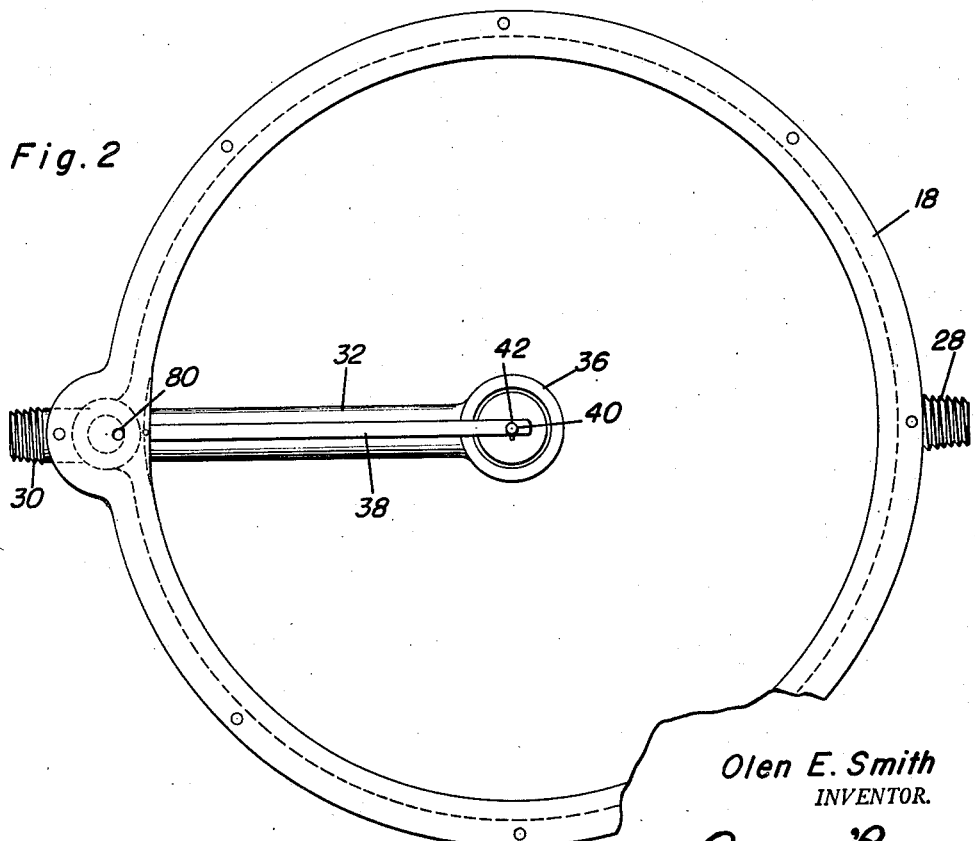

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical section through the valve assembly showing details of its internal construction; and Figure 2 is a horizontal section taken along section line 2—2 of Figure 1.

Referring now more particularly to the drawings, the reference numeral 10 indicates generally the valve housing comprising the main portion of the valve assembly and which specifically includes the upper housing half 12 and the lower half 14 each provided with the annular flanges 16 and 18 through which the fastening means 20 extend for securing the halves together to form a complete housing. The housing is preferably formed of generally cylindrical configuration and a circular diaphragm plate 22 is disposed between the housing halves with peripheral portions thereof disposed between the flanges 16 and 18 and rigidly secured thereby. The diaphragm is preferably formed of suitable flexible metallic material although it will be understood that other types of flexible material would suffice.

The diaphragm sub-divides the housing into the upper chamber 24 and the lower chamber 26 in the manner most clearly shown in Figure 1 and it will be seen that the lower chamber is provided with the outlet nipple 28 as well as the inlet nipple 30. A radial boss 32 is provided in the lower housing half with its outer end communicating with an inlet aperture 34 formed in the nipple 30 and provided throughout its length with a passageway terminating in a frusto-conical recess formed by an enlarged valve seat portion 36.

A flexible metallic band 38 is secured at one end to the inner wall of the lower housing half and receives a valve stem 40 through its opposite apertured end, the stem being held against withdrawal therefrom by means of the pin 42. A valve body 44 secured to the lower end of the stem is provided with an annular recess receiving a ring of resilient material 46 which is engageable with the inner surface of the valve seat portion 36 to seal off the lower chamber 26 from the inlet aperture 34 as will be readily apparent.

A lever 48 is pivotally secured adjacent one end to the inner surface of the upper housing half by means of bracket ears 50 and an associated pin 52 with the inner free end of the lever connected through the medium of a link 54 to the upper surface of the diaphragm 22, this link being pinned as at 56 and 58 to the diaphragm and lever, respectively. A recessed projection 60 on the top of the upper housing half receives a threaded plug 62 and houses a compression spring 64 interposed between the plug and an intermediate portion of the lever 48 to normally urge the same downwardly so that the diaphragm urges the valve into engagement with its seat in the manner shown in dotted lines in Figure 1. A manual reset lever 66 is secured at its lower end to the member 48 and projects through the plug to terminate at its upper end in a knob portion 68 for manual manipulation as will be presently apparent, the lever 66 being slidably supported in a bore extending through plug 62 with sufficient clearance to permit the passage of gas thereby. A suitable cover 70 may be provided to seal the manual reset mechanism.

The outer end of the lever 48 is pivotally secured as at 72 to the shank of a needle valve 74 whose lower end is tapered as indicated by the reference character 76 and is adapted to seat in a resilient seat member 78 carried by the upper housing half. A bore 80 opens into a recess portion 82 in the lower housing half which is in communication with the inlet opening 34 so that when the needle valve 74 is unseated the upper chamber will be in communication with the inlet aperture as will be readily apparent. A portion of the upper housing half is provided with a lug portion 84 having a bore through which the shank of a needle valve extends and is guided, a recessed plug 86 being provided in a threaded aperture immediately above the needle valve to permit ready servicing of this assembly and withdrawal of the needle valve from the housing when desired.

The operation of the device is as follows: The cut-off valve is disposed within a fluid line such as natural gas or the like and would normally be disposed in the open position shown in full lines in Figure 1 by reason of the pressure within the line with which it is associated urging the diaphragm 22 to the position shown to seat the needle valve 74 and allow the cut-off valve 44 to unseat as shown. Should the pressure within the fluid line fall to such a point due to rupture or other difficulty in the line, the compression spring 64 will have sufficient force to press the diaphragm downwardly to the dotted line position show to thereby seat the cut-off valve 44 and unseat the needle valve 74. During normal shut-down of such fluid lines due to any reason what so ever, it is necessary to notify all consumers before turning on the pressure in the line again since it is quite possible that an appliance in a home may have been left open subsequent to the gas shut-down which would, of course, result in a highly dangerous condition within the home. With the above described shut-off valve assembly installed in the consumer's line, upon turning the gas on after a shut-down, the upper chamber of the valve housing would be filled with the gas under pressure by reason of the fact that the needle valve 74 would be unseated and the pressure of this gas upon the upper surface of the diaphragm 22 would positively engage the shut-off valve in its associated seat so as to prevent gas from entering the consumer's appliances through the outlet 28. The consumer, realizing something is amiss, will check all of his gas appliances and will proceed to manipulate the manual reset plunger 66 to pull upwardly on the diaphragm 22 and unseat the shut-off valve while seating the needle valve assembly allowing gas to reenter his supply lines. Any gas trapped in chamber 24 will be relieved about the bore portion in the plug 62 through which reset plunger 66 slides, until the pressure beneath the diaphragm is sufficient to maintain the diaphragm in the elevated position shown in Figure 1. This, of course, is provided for the purpose of reducing the pressure in the chamber 24 to permit the pressure on the undersurface of the diaphragm to maintain the valve 44 in open position.

It will be realized, that the threaded plug 62 may be manipulated to provide more or less compression by the spring 64 to adjust the same to various gas pressures within the supply line.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A cut-off valve assembly comprising a housing provided with a flexible diaphragm sub-dividing the interior thereof into an upper and a lower chamber, a valve seat in said lower chamber provided with an inlet aperture, a shut-off valve in said lower chamber between said diaphragm and said seat and movable under the influence of said diaphragm into and out of engagement with said seat, resilient means in said upper chamber urging said diaphragm toward said seat, said means including a lever pivoted adjacent one end to said housing, the other end of said lever being connected to said diaphragm, a spring interposed between an intermediate portion of said lever and said housing, a bore portion in the housing providing communication between the upper chamber and the inlet aperture, a second valve seat interposed between the bore portion and the upper chamber, and a second valve carried by said one end of the lever and engageable with said second valve seat for establishing communication between said inlet aperture and said upper chamber when said shut-off valve is in engagement with its seat, said upper chamber being sealed with respect to the outside of the housing, and when said valve is closed, being sealed from the lower chamber, and reset means connected to said lever for setting the shut-off valve in a position above said valve seat, and for positioning said second valve on said second valve seat, and means for bleeding pressure fluid from said upper chamber.

References Cited in the file of this patent

UNITED STATES PATENTS

| | | |
|---|---|---|
| 359,787 | Hyams | Mar. 22, 1887 |
| 797,664 | Cottingham | Aug. 22, 1905 |
| 942,042 | Petley | Nov. 30, 1909 |
| 1,037,275 | Marin | Sept. 3, 1912 |
| 1,552,822 | Cathey | Sept. 8, 1925 |
| 2,050,562 | Lawter | Aug. 11, 1936 |

FOREIGN PATENTS

| | | |
|---|---|---|
| 122,283 | Great Britain | Jan. 23, 1919 |